US010755112B2

(12) United States Patent
Mabuchi

(10) Patent No.: US 10,755,112 B2
(45) Date of Patent: Aug. 25, 2020

(54) SYSTEMS AND METHODS FOR REDUCING DATA STORAGE IN MACHINE LEARNING

(71) Applicant: Toyota Research Institute, Inc., Los Altos, CA (US)

(72) Inventor: Mitsuhiro Mabuchi, Santa Clara, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 220 days.

(21) Appl. No.: 15/919,376

(22) Filed: Mar. 13, 2018

(65) Prior Publication Data

US 2019/0289273 A1 Sep. 19, 2019

(51) Int. Cl.
*G06K 9/00* (2006.01)
*G06T 7/11* (2017.01)
*G06T 7/194* (2017.01)

(52) U.S. Cl.
CPC .......... *G06K 9/00791* (2013.01); *G06T 7/11* (2017.01); *G06T 7/194* (2017.01); *G06T 2207/10012* (2013.01)

(58) Field of Classification Search
CPC ............ G06K 9/6256; G06K 9/00791; G06K 9/6255; G06T 7/50–596;
(Continued)

(56) References Cited

U.S. PATENT DOCUMENTS 7,483,939 B2   1/2009  Mussack et al.
9,390,110 B2   7/2016  Thiyanaratnam
(Continued)

FOREIGN PATENT DOCUMENTS

CN   102111636 A   6/2011
CN   105389471 A   3/2016
(Continued)

OTHER PUBLICATIONS

Li, Peilun, et al. "Semantic-aware grad-gan for virtual-to-real urban scene adaption." arXiv preprint arXiv:1801.01726v1 (2018). (Year: 2018).*

(Continued)

*Primary Examiner* — Geoffrey E Summers
(74) *Attorney, Agent, or Firm* — Dinsmore & Shohl LLP

(57) ABSTRACT

Methods and systems for reducing an amount of data storage and/or processing power necessary for training data for machine learning by replacing three dimensional models with a plurality of two dimensional images are disclosed. The method includes determining an object of interest from a three-dimensional model and cropping the object of interest into a plurality of two-dimensional images. The plurality of two-dimensional images are cropped such that only the object of interest remain. The plurality of two-dimensional images are cropped with respect to particular attributes, such as a road width, a road angle, or an angle with respect to an adjacent vehicle. An image capturing device captures the real time background images. The objects within the background images are categorized using associated attributes. The attributes are synthesized with the plurality of two-dimensional images such that a plurality of replica two-dimensional images of the 3D model with real-time backgrounds are generated.

20 Claims, 5 Drawing Sheets

(58) Field of Classification Search
CPC . G06T 2207/10012; G06T 2207/10028; G06T 2207/10021; G06T 19/20; G06T 15/50–87; G06T 19/00–006; G06T 7/11; G06T 7/194; G06T 2207/30252; H04N 13/139
USPC .......................................... 382/154, 104, 155
See application file for complete search history.

(56) References Cited

U.S. PATENT DOCUMENTS

| | | | |
|---|---|---|---|
| 10,235,601 B1* | 3/2019 | Wrenninge | G06K 9/6256 |
| 2010/0245573 A1 | 9/2010 | Gomi et al. | |
| 2012/0288186 A1* | 11/2012 | Kohli | G06K 9/6255 382/159 |
| 2013/0162639 A1 | 6/2013 | Muench et al. | |
| 2013/0181823 A1 | 7/2013 | Stahlin et al. | |
| 2014/0063024 A1 | 3/2014 | Zhang et al. | |
| 2017/0243083 A1* | 8/2017 | Wang | G06K 9/00711 |
| 2018/0308281 A1* | 10/2018 | Okoyama | G06T 19/00 |
| 2018/0374253 A1* | 12/2018 | Yu | G06T 15/005 |
| 2019/0026558 A1* | 1/2019 | Tanigawa | G06K 9/00671 |
| 2019/0130218 A1* | 5/2019 | Albright | G06K 9/6262 |
| 2019/0251397 A1* | 8/2019 | Tremblay | G06K 9/6257 |

FOREIGN PATENT DOCUMENTS

| | | |
|---|---|---|
| JP | 2006072830 A | 3/2006 |
| KR | 20130127301 A | 11/2013 |
| WO | 2017157967 A1 | 9/2017 |

OTHER PUBLICATIONS

Alhaija, Hassan Abu, et al. "Augmented reality meets deep learning for car instance segmentation in urban scenes." British machine vision conference. vol. 1. 2017. (Year: 2017).*

Bochinski, Erik, Volker Eiselein, and Tomas Sikora. "Training a convolutional neural network for multi-class object detection using solely virtual world data." 2016 13th IEEE International Conference on Advanced Video and Signal Based Surveillance (AVSS). IEEE, 2016. (Year: 2016).*

Gaidon, Adrien, et al. "VirtualWorlds as Proxy for Multi-object Tracking Analysis." 2016 IEEE Conference on Computer Vision and Pattern Recognition (CVPR). IEEE, 2016. (Year: 2016).*

López, Antonio M., et al. "Training my car to see using virtual worlds." Image and Vision Computing 68 (2017): 102-118. (Year: 2017).*

Praveen, K., Jashojit Mukherjee, and Venugopala Madumbu. "Adverse weather simulation for training neural networks." 2017 IEEE International Conference on Consumer Electronics-Asia (ICCE-Asia). IEEE, 2017. (Year: 2017).*

* cited by examiner

SYSTEMS AND METHODS FOR REDUCING DATA STORAGE IN MACHINE LEARNING

TECHNICAL FIELD

The present specification generally relates to reducing the amount of storage space that is required for training data used for machine learning and, more specifically, to systems and methods for generating two-dimensional images from three-dimensional models, where the two-dimensional images are used as training data.

BACKGROUND

Currently, computing devices, particularly those associated with machine learning for autonomous and semi-autonomous vehicles, store three dimensional (3D) models that are used as training data for machine learning. This type of training data is computationally expensive and requires a large amount of storage space. As such, it may be difficult for on-board vehicle processors to effectively utilize the training data.

SUMMARY

In one embodiment, a method for reducing a size of machine learning data is provided. The method includes receiving, by a processing device, data including a three-dimensional model. A scene within the three-dimensional model is analyzed, by the processing device, to identify an object on interest and one or more additional objects. The processing device captures the object of interest and the one or more additional objects as a plurality of two-dimensional images. The processing device removes the one or more additional objects from the plurality of two-dimensional images to obtain a plurality of cropped two-dimensional images. The processing device stores the plurality of cropped two-dimensional images.

In another embodiment, a system for decreasing an amount of data storage used to contain training data in machine learning is provided. The system includes a processing device and a non-transitory, processor-readable storage medium. The non-transitory, processor readable storage medium includes one or more programming instructions thereon that, when executed, cause the processing device to receive data such as a three-dimensional model. The non-transitory, processor-readable storage medium further includes one or more programming instructions thereon that, when executed, cause the processing device to analyze a scene within the three-dimensional model to identify an object of interest and one or more additional objects, capture the object of interest and the one or more additional objects as a plurality of two-dimensional images, remove the one or more additional objects from the plurality of two-dimensional images so to obtain a plurality of cropped two-dimensional images, and store the plurality of cropped two-dimensional images.

In yet another embodiment, a system for decreasing an amount of data storage used to contain training data in machine learning is provided. The system includes a processing device, an image capturing device communicatively coupled to the processing device, an external device communicatively coupled to the processing device, and a non-transitory, processor-readable storage medium. The non-transitory, processor readable storage medium comprising one or more programming instructions thereon that, when executed, cause the processing device to receive data such as a three-dimensional model, analyze a scene within the three-dimensional model to identify an object of interest and one or more additional objects and capture the object of interest and the one or more additional objects as a plurality of two-dimensional images. Further, the non-transitory, processor-readable storage medium includes one or more programming instructions thereon that, when executed, cause the processing device to transmit the plurality of two-dimensional images to the external device and receive a signal from the external device indicating that the plurality of two-dimensional images are realistic images. The non-transitory, processor-readable storage medium further includes one or more programming instructions thereon that, when executed, cause the processing device to remove the one or more additional objects from the plurality of two-dimensional images to obtain a plurality of cropped two-dimensional images and store the plurality of cropped two-dimensional images.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Referring generally to the figures, embodiments described herein are directed systems and methods for reducing an amount of data storage and/or processing power necessary for training data for machine learning by replacing three dimensional (3D) models with a plurality of two dimensional (2D) images. The 3D models may be, for example, design models, such as CAD drawings, 3D data gathered by one or more sensors, and/or the like. The 3D models are analyzed by a semantic segmentation method. In particular, a specific scene within the 3D model may be analyzed to identify an object of interest and may also identify one or more additional objects. A plurality of 2D images of the object of interest and one or more additional objects are captured from various angles, levels of zoom, and/or the like. The plurality of 2D images are cropped such that only the object of interest remains and the one or more additional objects are removed.

In addition, a background image is captured by an image capturing device. As such, the background image comes from real time, live images of a background that surrounds an object of interest, such as a vehicle. The image capturing device may capture images in real-time related to weather and environmental information. The background image contains information from the background surrounding the object of interest, such as other objects and attributes. The background image is categorized and selected attributes, such as a weather attribute, a lighting attribute, and/or a shading attribute are then added to the plurality of cropped 2D images. The plurality of cropped 2D images and the selected attribute are synthesized and annotated such that the 2D images may be used as training data for machine learning. As a result, the 2D images replace 3D models as training data, which decreases an amount of data storage used to contain the training data. In addition, the systems and methods described herein can produce data that can be utilized by relatively less powerful processors, such as, for example, processors located within vehicle-based computing devices.

Figure 1:
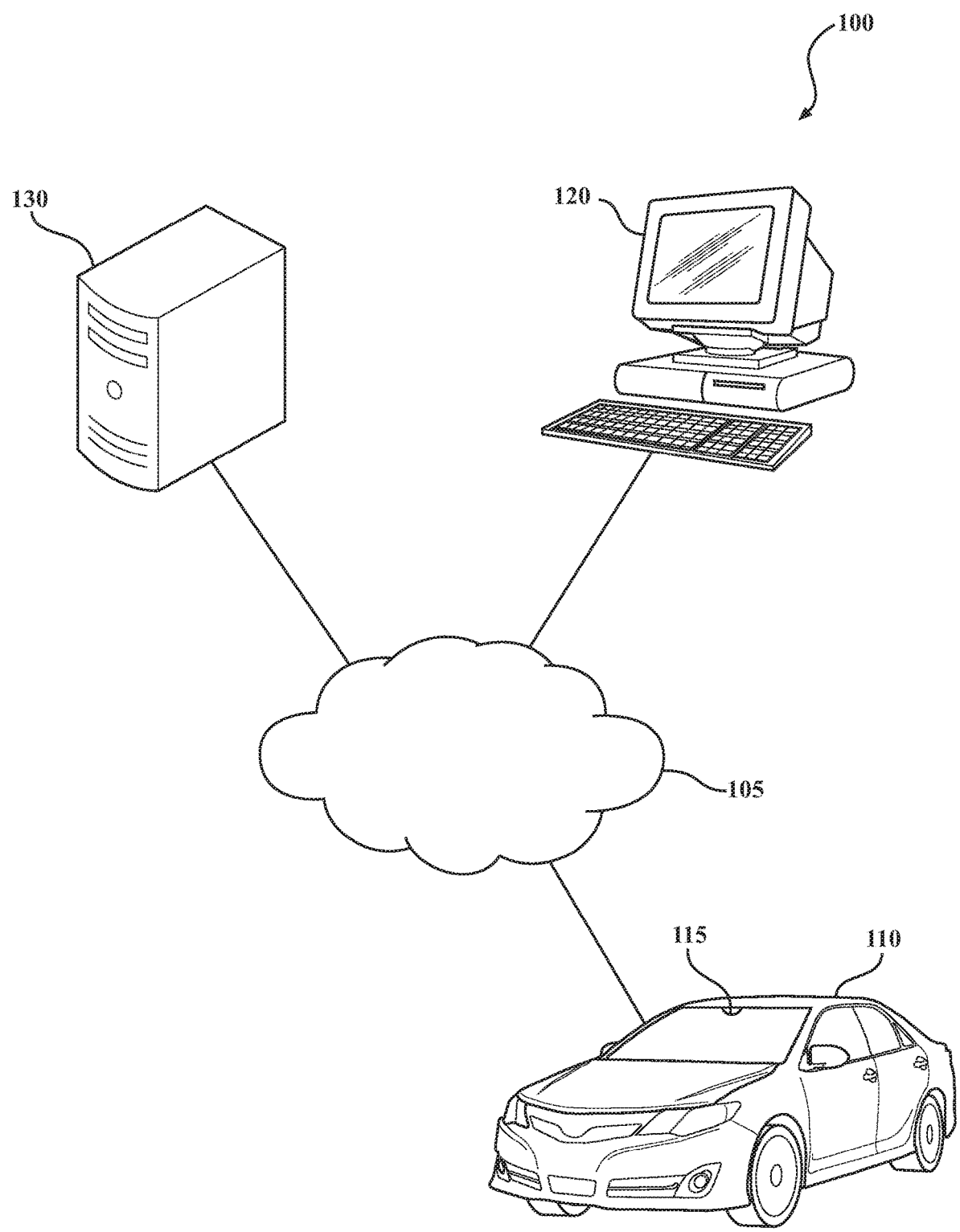
FIG. 1 schematically depicts an illustrative network having components for a system that generates two-dimensional images from three-dimensional models according to one or more embodiments shown and described herein.

Referring now to the drawings, FIG. 1 depicts an illustrative network 100 having components for a system for generating cropped 2D images from 3D models that are used as training data for machine learning according to embodiments shown and described herein. As illustrated in FIG. 1, a computer network 105 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The computer network 105 may generally be configured to electronically connect one or more devices such as computing devices and/or components thereof. Illustrative devices may include, but are not limited to, a vehicle 110, a user computing device 120, and a server computing device 130.

The vehicle 110 may generally be any vehicle with one or more onboard computing devices, particularly computing devices that contain hardware for processing data, storing data, and capturing images in or around the vehicle. Thus, the vehicle 110 and/or components thereof may perform one or more computing functions, such as receiving data, capturing image data (e.g., 2D images) with an image capturing device 115, processing the captured images, storing the processed images, and providing processed images for machine learning algorithms, as described in greater detail herein.

The user computing device 120 may generally be used as an interface between a user and the other components connected to the computer network 105. Thus, the user computing device 120 may be used to perform one or more user-facing functions, such as receiving one or more inputs from a user or providing information to the user, as described in greater detail herein. Accordingly, the user computing device 120 may include at least a display and/or input hardware, as described in greater detail herein. In the event that the server computing device 130 requires oversight, updating, and/or correction, the user computing device 120 may be configured to provide the desired oversight, updating, and/or correction. The user computing device 120 may also be used to input additional data into a corpus of data stored on the server computing device 130. For example, the user computing device 120 may contain software programming or the like that relates to viewing, interpreting, and/or capturing 2D images and 3D models, as well as software programming that relates generating to 2D images from 3D models.

The server computing device 130 may receive data from one or more sources, generate data, store data, index data, search data, and/or provide data to the user computing device 120 and/or the vehicle 110 (or components thereof). In some embodiments, the server computing device 130 may employ one or more machine learning algorithms that are used for the purposes of analyzing data that is received from the vehicle 110, such as a plurality of captured 2D images, as described in greater detail herein. Moreover, the server computing device 130 may be used to produce data, such as performing one or more semantic segmentation functions as described in greater detail herein. It should be appreciated that the vehicle on board computing systems may function with the server computing device such that the vehicle on board computing systems may perform the one or more semantic segmentation functions and/or employ the one or more machine learning algorithms.

It should be understood that while the user computing device 120 is depicted as a personal computer and the server computing device 130 is depicted as a server, these are non-limiting examples. In some embodiments, any type of computing device (e.g., mobile computing device, personal computer, server, etc.) may be used for any of these components. Additionally, while each of these computing devices is illustrated in FIG. 1 as a single piece of hardware, this is also merely an example. Each of the user computing device 120 and the server computing device 130 may represent a plurality of computers, servers, databases, components, and/or the like.

Figure 2A:
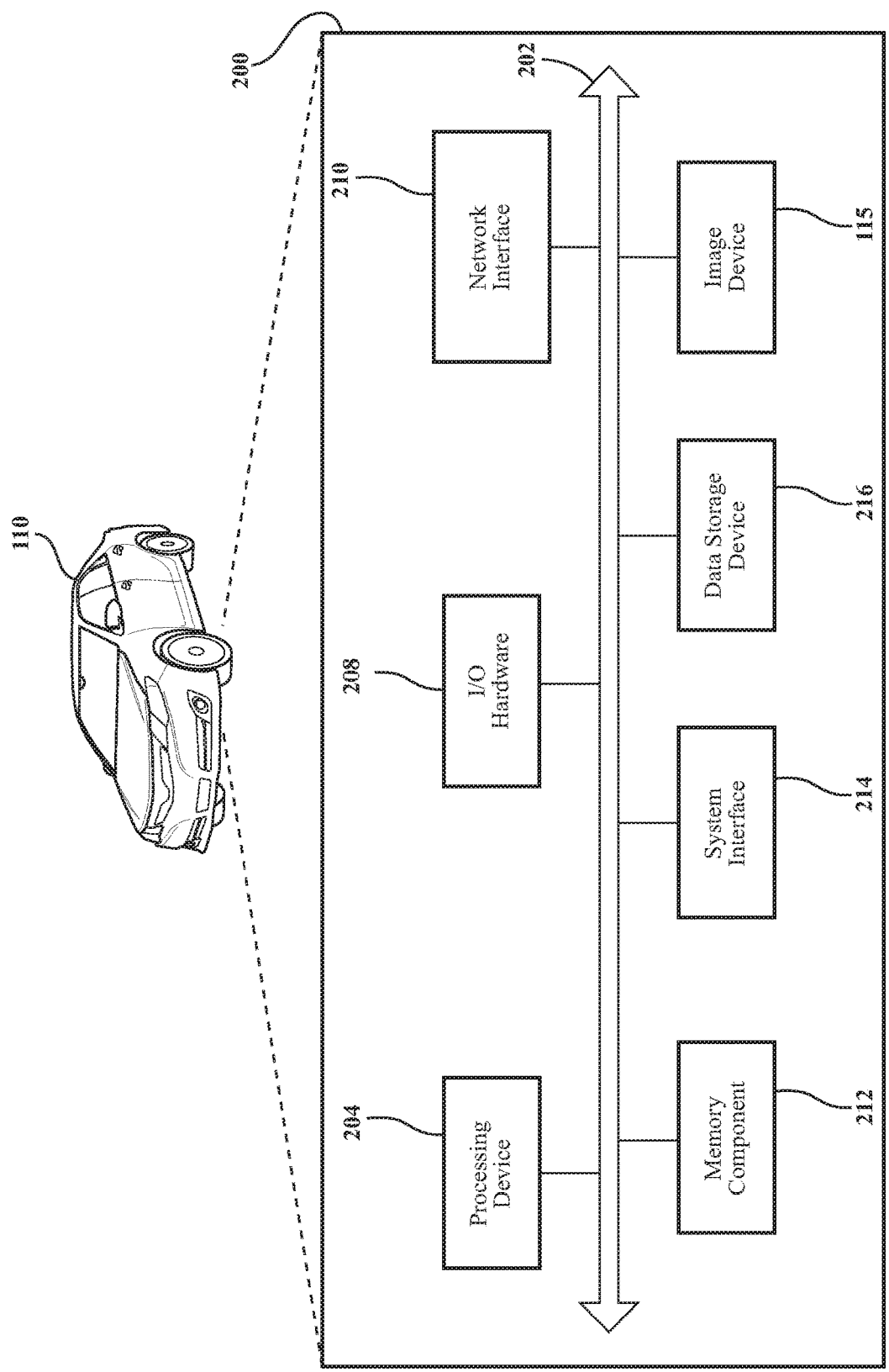
FIG. 2A schematically depicts illustrative hardware components of a vehicle computing device that may be used in generating two-dimensional images from three-dimensional models according to one or more embodiments shown and described herein.

FIG. 2A schematically depicts illustrative hardware components of the vehicle 110 that may be used in data creation for machine learning. While the components depicted in FIG. 2A are described with respect to the vehicle 110, it should be understood that similar components may also be used for the user computing device 120 (FIG. 1) and/or the server computing device 130 (FIG. 1) without departing from the scope of the present disclosure.

The vehicle 110 may include a vehicle component 200 having a non-transitory computer-readable medium for completing the various processes described herein, embodied as hardware, software, and/or firmware, according to embodiments shown and described herein. While in some embodiments the vehicle component 200 may be configured as a general purpose computer with the requisite hardware, software, and/or firmware, in other embodiments, the vehicle component 200 may also be configured as a special purpose computer designed specifically for performing the functionality described herein. For example, the vehicle component 200 may be a device that is particularly adapted to utilize machine learning algorithms for the purposes of autonomously or semi-autonomously controlling the vehicle 110.

In another example, the vehicle component 200 may be a device that is particularly adapted to utilize machine learning algorithms for the purposes of monitoring a driver and/or a passenger of the vehicle, predict the driver's and/or passenger's movements or actions, and provide feedback and/or execute commands. Other uses of machine learning in vehicles should be understood. In embodiments where the vehicle component 200 is a general purpose computer, the systems and methods described herein provide a mechanism for improving functionality by replacing 3D models with 2D images such that the machine learning processes may be completed by less powerful processors, processors that require fewer resources, and/or in lesser amounts of time.

Still referring to FIG. 2A, the vehicle component 200 may generally be an onboard vehicle computing system. In some embodiments, the vehicle component 200 may be a plurality of vehicle computing systems.

As also illustrated in FIG. 2A, the vehicle component 200 may include a processing device 204, an I/O hardware 208, a network interface hardware 210, a non-transitory memory component 212, a system interface 214, a data storage device 216, and an image capturing device 115. A local interface 202, such as a bus or the like, may interconnect the various components.

The processing device 204, such as a computer processing unit (CPU), may be the central processing unit of the vehicle component 200, performing calculations and logic operations to execute a program. The processing device 204, alone or in conjunction with the other components, is an illustrative processing device, computing device, processor, or combination thereof. The processing device 204 may include any processing component configured to receive and execute instructions (such as from the data storage device 216 and/or the memory component 212).

The memory component 212 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The memory component 212 may include one or more programming instructions thereon that, when executed by the processing device 204, cause the processing device 204 to complete various processes, such as the processes described herein with respect to FIG. 3. Still referring to FIG. 2A, the programming instructions stored on the memory component 212 may be embodied as a plurality of software logic modules, where each logic module provides programming instructions for completing one or more tasks, as described in greater detail below with respect to FIG. 2B.

The network interface hardware 210 may include any wired or wireless networking hardware, such as a modem, a LAN port, a wireless fidelity (Wi-Fi) card, WiMax card, mobile communications hardware, and/or other hardware for communicating with other networks and/or devices. For example, the network interface hardware 210 may provide a communications link between the vehicle 110 and the other components of the network 100 depicted in FIG. 1, including (but not limited to) the server computing device 130.

Still referring to FIG. 2A, the data storage device 216, which may generally be a storage medium, may contain one or more data repositories for storing data that is received and/or generated. The data storage device 216 may be any physical storage medium, including, but not limited to, a hard disk drive (HDD), memory, removable storage, and/or the like. While the data storage device 216 is depicted as a local device, it should be understood that the data storage device 216 may be a remote storage device, such as, for example, a server computing device or the like (e.g., the server computing device 130 of FIG. 1). Illustrative data that may be contained within the data storage device 216 is described below with respect to FIG. 2C. It should be appreciated that the amount of available storage space in the data storage device 216 may be limited due to its location in the vehicle component 200 in some embodiments. As such, it may be necessary to minimize the size of the data stored thereon, as described in greater detail herein.

Still referring to FIG. 2A, the I/O hardware 208 may communicate information between the local interface 202 and one or more other components of the vehicle 110. For example, the I/O hardware 208 may act as an interface between the vehicle component 200 and other components, such as navigation systems, meter units, mobile phone systems, infotainment systems, and/or the like. In some embodiments, the I/O hardware 208 may be utilized to transmit one or more commands to the other components of the vehicle 110.

The system interface 214 may generally provide the vehicle component 200 with an ability to interface with one or more external devices such as, for example, the user computing device 120 and/or the server computing device 130 depicted in FIG. 1. Communication with external devices may occur using various communication ports (not shown). An illustrative communication port may be attached to a communications network.

Still referring to FIG. 2A, the image capturing device 115 may be communicatively coupled to the local interface 202 and coupled to the processing device 204 via the local interface 202. The image capturing device 115 may be any imaging device, sensor, or detector that is suitable for obtaining images. As used herein, the term "images" or "image" refers to video images (i.e., a sequence of consecutive images), still images (including still images isolated from video images), and/or image data. Any suitable commercially available image capturing device 115 may be used without departing from the scope of the present disclosure. In some embodiments, the image capturing device 115 may be coupled to one or more other components that provide additional functionality for imaging, such as, for example, one or more sensors.

The image capturing device 115 may include or may be coupled to a lens (not shown). The lens is not limited by this disclosure and may generally be any optical component that is configured to focus the light entering the image capturing device 115 such that an image can be properly obtained. In some embodiments, the lens may be a fixed lens that is not adjustable. In other embodiments, the lens may be adjustable, either manually or automatically by the processing device 204, to zoom in on an object, zoom out on an object, and/or adjust the focus of the light entering the image capturing device 115.

Figure 2B:
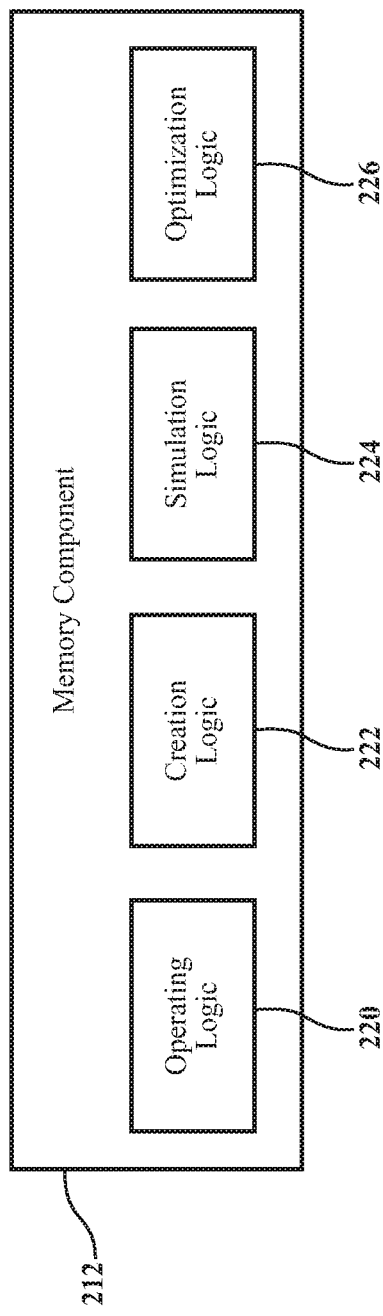
FIG. 2B schematically depicts an illustrative memory component containing illustrative logic components according to one or more embodiments shown and described herein.

With reference to FIG. 2B, in some embodiments, the program instructions contained on the memory component 212 may be embodied as a plurality of software modules, where each module provides programming instructions for completing one or more tasks. For example, FIG. 2B schematically depicts the memory component 212 containing illustrative logic components according to one or more embodiments shown and described herein. As shown in FIG. 2B, the memory component 212 may be configured to store various processing logic, such as, for example, operating logic 220, creation logic 222, simulation logic 224, and/or optimization logic 226 (each of which may be embodied as a computer program, firmware, or hardware, as an example). The operating logic 220 may include an operating system and/or other software for managing components of the vehicle component 200 (FIG. 2A). Further, the operating logic 220 may contain one or more software modules for transmitting data, and/or analyzing data.

Still referring to FIG. 2B, the creation logic 222 may contain one or more software modules for collecting data from one or more sources (e.g. the image capturing device 115, the server computing device 130 depicted in FIG. 1, and/or the like) and/or converting data, as described in greater detail herein. Moreover, the creation logic 222 may create and/or process the 2D images such that data may be extracted from the 2D images or such that the data within the 2D images or the 3D model may be analyzed. The simulation logic 224 may contain one or more software modules for determining whether certain data is synthesized, such as the 2D images merged with information relating to the live background images, as described in greater detail herein. The simulation logic 224 may determine whether the 2D image and the 3D model are in the same domain (e.g., whether the respective 2D image and/or 3D model is semantically segmented for analysis, a realistic image, in original format, and/or the like). The simulation logic 224 may reside on different computing devices. As an example, one or more of the functionalities and/or components described herein may be provided by the user computing device 120 and/or the server computing device 130, which may be coupled to the memory component 212 via the network 100, such that access to the simulation logic 224 may be provided. For example, the processing device 204 (FIG. 2A) may access the simulation logic 224 to communicate and retrieve the 3D model data and then use the server computing device 130 and/or the like to manipulate the 3D model data. The optimization logic 226 may contain one or more software modules for determining and annotating positions, either in 2D and/or in 3D, and may annotate objects, pixels, and/or the like using bounding boxes, pixel-wise annotations, coordinate-based annotation, and/or the like, as discussed in greater detail herein.

Figure 2C:
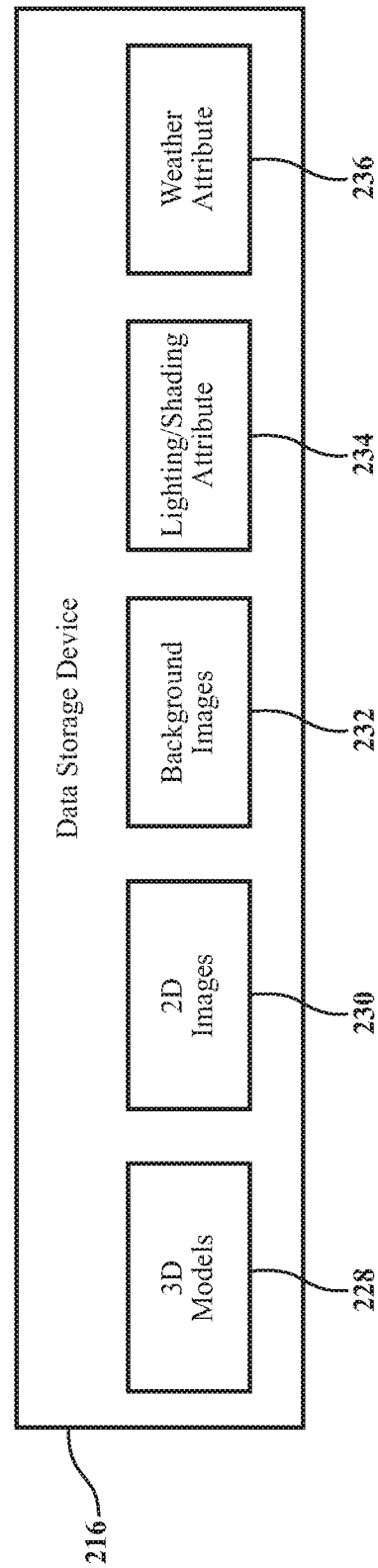
FIG. 2C schematically depicts an illustrative data storage device containing illustrative data components according to one or more embodiments shown and described herein.

FIG. 2C schematically depicts a block diagram of various data contained within a storage device (e.g., the data storage device 216). As shown in FIG. 2C, the data storage device 216 may include, for example, a plurality of stored 3D model data 228, such as CAD files or data which has been processed using sematic segmentation methods, as discussed herein. Moreover, it should be understood that the 3D model data 228 may be vehicle design data or an engineering model having only a single image of a specific object without a background. It should also be understood that the 3D model data 228 may also be data gathered by autonomous vehicles sensors (not shown) wherein the 3D model data may include a plurality of images of objects and/or data of objects. The 3D model data 228 may be received, for example, from the server computing device 130 (FIG. 1) or received from, for example, autonomous vehicles sensors (not shown). It should be appreciated that the plurality of stored 3D model data 228 may not be stored permanently, but instead may be stored temporarily such that the data may be extracted therefrom.

The data storage device 216 may further include, for example, a plurality of 2D image data 230, which may be extracted from the 3D models, as discussed in greater detail herein. In addition, the plurality of 2D image data 230 may be received from the image capturing device 115 (FIG. 1) and/or the server computing device 130 (FIG. 1). The data storage device 216 further includes a plurality of captured background images 232, a plurality of captured lighting and shading attributes 234, and/or a plurality of captured weather attributes 236. The plurality of captured background images 232 and the captured attributes 234, 236 may be received from the image capture device (FIG. 2A) and/or the server computing device 130 (FIG. 1). The plurality of captured background images 232 and the captured attributes 234, 236 may be captured in real time or may be created, as will be discussed in greater detail herein. In some embodiments, the captured background images 232 may include, for example, buildings, roads, bikes, pedestrians, a portion or the entire object of interest, and/or the like. In some embodiments, the plurality of captured lighting and/or shading attributes 234 may include whether it is sunny, overcast, daytime, nighttime, and the like. The plurality of captured weather attributes 236 may include, for example, fog, rain, snow, and the like. The background images, when captured by the image capturing device 115 (FIG. 2A) are processed by the processing device 204 (FIG. 2A) and/or the memory component 212 (FIG. 2A).

It should be understood that the components illustrated in FIGS. 2A-2C are merely illustrative and are not intended to limit the scope of this disclosure. More specifically, while the components in FIGS. 2A-2C are illustrated as residing within the vehicle component 200 of the vehicle 110, this is a non-limiting example. In some embodiments, one or more of the components may reside external to the vehicle component 200 and/or the vehicle 110. Similarly, as previously described herein, while FIGS. 2A-2C are directed to the vehicle component 200 of the vehicle 110, other components such as the user computing device 120 and the server computing device 130 may include similar hardware, software, and/or firmware.

As mentioned above, the various components described with respect to FIGS. 2A-2C may be used to carry out one or more processes and/or produce data that can be completed by less powerful processors and/or processors that require fewer resources, such as, for example, vehicle-based computing devices.

Now referring to FIGS. 3 and 4A, the method 300 of reducing a size of machine learning training data will now be discussed. An input may be received at block 302. The input may generally include data comprising a 3D model, such as a 3D CAD file from the server computing device 130 (FIG. 1). The input may be received via the system interface 214 and may be analyzed, by the processing device 204 (FIG. 2A), using for example, semantic segmentation methods, at block 304. Use of semantic segmentation causes the processing device 204 (FIG. 2A) to partition the image into semantically meaningful parts, classify each part and/or pixel into one of the pre-determined classes, such as by a predetermined number of pixels, or by object identification and/or labeling. That is, with semantic segmentation, each image, segment, and/or pixel is labeled and/or classified such that each pixel in the scene may be identified and understood. It should be appreciated that the 3D model may already be in the semantically segmented format when received such that the step at block 304 may be omitted. Further, it should be appreciated that the 3D model may be a model that has been generated from information received from a plurality of sensors on the vehicle 110 (FIG. 1), such as, for example autonomous or semi-autonomous vehicle sensors.

Figure 3:
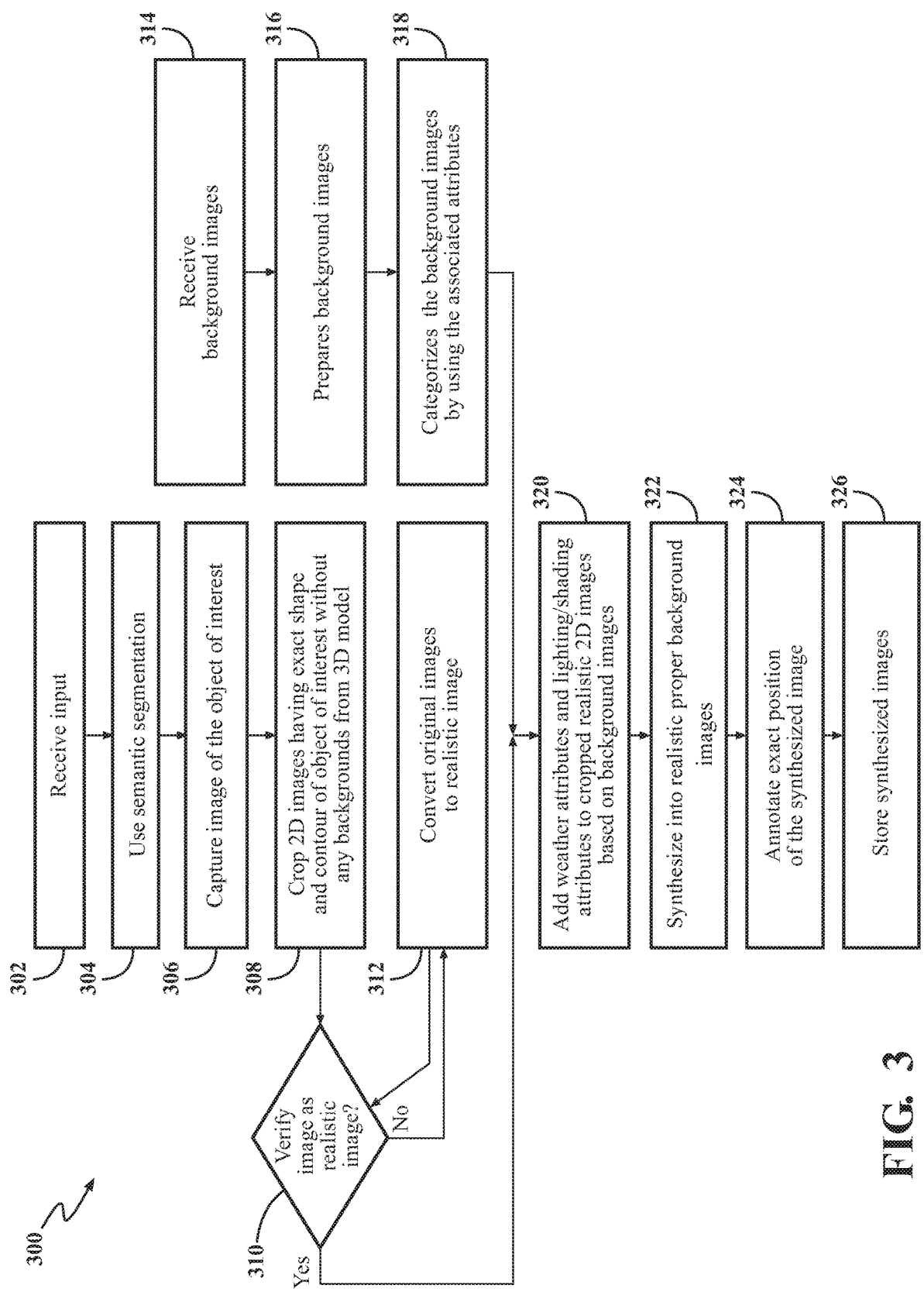
FIG. 3 depicts a flow diagram of an illustrative method of generating two-dimensional images from three-dimensional models according to one or more embodiments shown and described herein.
Figure 4B:
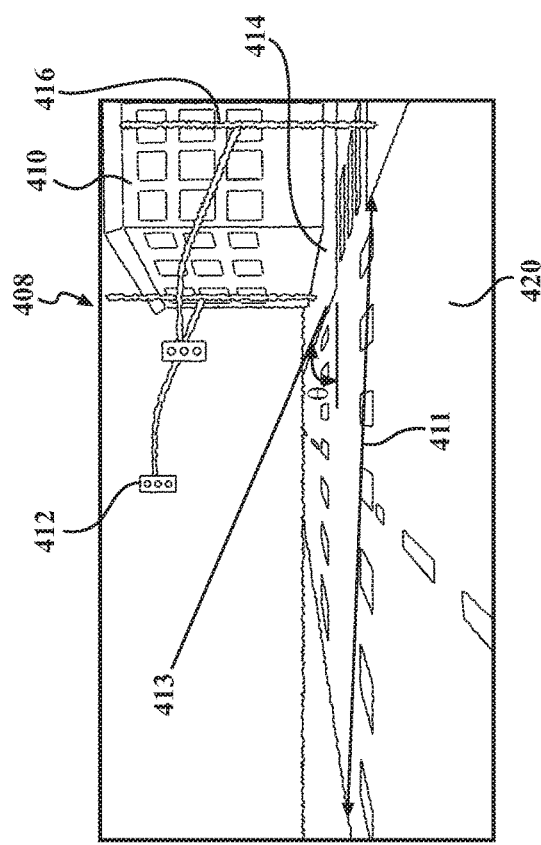
FIG. 4B schematically depicts an illustrative view of a background image according to one or more embodiments shown and described herein.
Figure 4D:
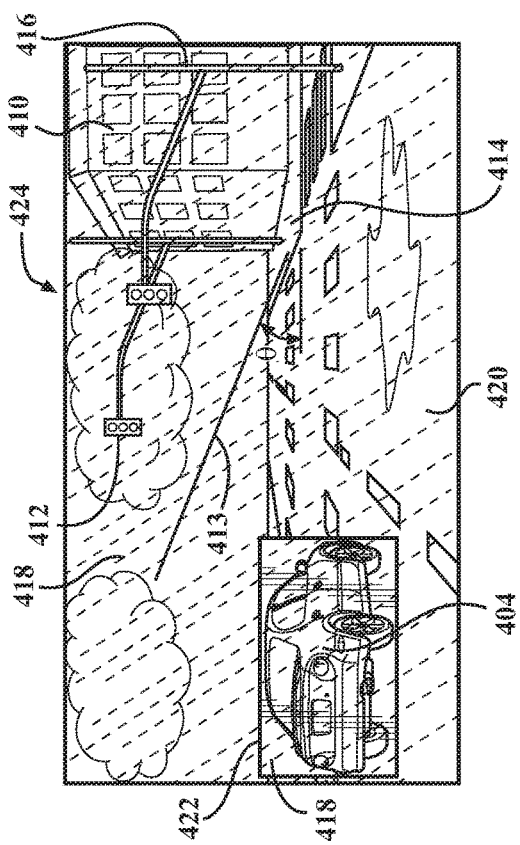
FIG. 4D schematically depicts an illustrative view of a synthesized image according to one or more embodiments shown and described herein.
Figure 4A:
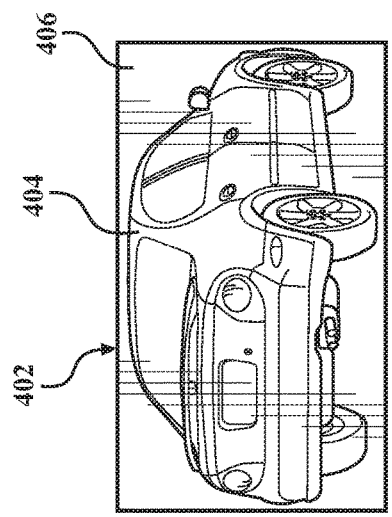
FIG. 4A schematically depicts an illustrative view of a cropped two dimensional image according to one or more embodiments shown and described herein.

Still referring to FIGS. 3 and 4A, the scene of the 3D model is analyzed by the processing device 204 to identify an object of interest 404 and one or more additional objects. The scene in the 3D model may incorporate several objects that surround a particular object of interest or may be devoid of other objects. For example, the scene in the 3D model may be vehicle design data or an engineering model having only a single image of a specific object without one or more additional objects. In another example, the scene in the 3D model may contain one or more additional objects such as objects that are included when a model is sampled from data received from autonomous vehicles sensors or the like. The object of interest 404 is captured from the 3D model at block 306. The object of interest 404 illustrated in FIG. 4A is an entire vehicle. However, it should be understood that the object of interest may be a portion of the vehicle such as a hood, a driver of the vehicle, a passenger, and/or the like. It should be appreciated that, as discussed above, in some 3D models, additional objects may surround the object of interest. For example, 3D models generated from autonomous imaging systems may contain additional objects. For example, in a street scene captured by the autonomous imaging system, there may be additional objects such as roads, structures, pedestrians, another car, a bike, and/or the like. In other embodiments, the scene may be from within the vehicle where additional objects, such as, without limitation, a meter, a steering wheel, a shift handle, a navigation device, and the like may be present.

At block 308, the processing device 204 (FIG. 2A) removes any additional objects which may surround the object of interest 404 in the 2D images, as best seen in FIG. 4A, such that the plurality of cropped 2D images 402 of the object of interest are obtained. The plurality of cropped 2D images 402 are captured from various angles, levels of zoom, and/or the like. For instance, if the object of interest 404 has blended pixels or is unclear where the object of interest and the additional objects intersect, the processing device 204 (FIG. 2A) and the memory component 212 (FIG. 2A) may rotate the 3D model to determine the exact shape of the object of interest 404. Therefore, the plurality of cropped 2D images 402 matches the exact shape and contour of the object of interest 404 from the 3D model.

The plurality of cropped 2D images 402 may be cropped by using various attributes, such as, for example, a road width attribute 411 (FIG. 4B), a road angle attribute 413 (FIG. 4D), an angle of a surrounding vehicle (not shown), and/or the like. These attributes may be used to establish relationships between objects of interest and 3D surfaces and/or establish relationships between the scene attributes and an object presence. As such, the attribute may be used to identify the objects of interest from additional objects as well as describe an intra-class variation such that the object of interest may be cropped from the scene. For example, in the street scene described above, each object in the scene may be assigned an attribute such that the objects may be identified. Based on this identification, the object of interest 404 may be cropped from the scene such that only the object of interest remains and the one or more additional objects are removed. In addition, the weather attributes 418 (FIG. 4D) and the lighting and/or shading attributes (not shown) are also removed from the plurality of cropped 2D images 402.

With reference to FIG. 4A, one of the plurality of cropped 2D images 402 is shown. The object of interest 404 in the 3D model includes additional objects. These objects, such as background information 406, the weather attributes, and the lighting and/or shading attributes are removed when the object of interest 404 is cropped. As a result, the object of interest 404 is isolated from any background information 406 and/or attributes. It should be appreciated that the object of interest 404 is illustrated as a 2D realistic computer generated image. It should also be appreciated that the image may be a high resolution image created by generative adversarial network (GAN).

Referring again to FIGS. 3 and 4A, at block 310, a determination may be made as to whether the plurality of cropped 2D images 402 are realistic images. The determination may be made by an external device, such as the server computing device 130 or the like. As such, the plurality of two-dimensional images may be transmitted to the external device for analysis, and the processing device 204 may receive a signal from the external device indicating that the plurality of two-dimensional images are realistic images. However, it should be appreciated that the determination may be made locally without the use of an external device.

Realistic images are generally understood to have real world datasets. As such, this framework enables a rapid transformation of 3D surface measurement data of real objects into a structured representation for realistic images. That is, real world images have lots of information embedded therein relating to the environment, illumination, surface materials, shapes, and the like. On the other hand, non-realistic images, such as the semantically segmented images from the 3D model (computer graphic image), are generally not rich in textures and shadows. As such, if the image is determined to not be the realistic image, at block 310, then the semantically segmented images will be converted into realistic images at block 312. It should be appreciated that converting the semantically segmented images to the plurality of cropped 2D images 402 is by using methods that those skilled in the art would appreciate. For example, the original images may be converted into a realistic images using a neural network or deep learning. Once the image has been converted into the realistic image, the plurality of cropped 2D images 402 is again verified at block 310.

Now referring to FIGS. 3 and 4B, in some embodiments, the processing device 204 may receive background images 408, at block 314, from the image capturing device 115. The background images 408 are images and information that the image capturing device 115 may capture that surround the object of interest 404. The background images 408 may include a plurality of background attributes, as best seen in FIG. 4B. In a non-limiting example, the plurality of background attributes may include a structure such as a building 410, a traffic light signal 412, a sidewalk 414, a traffic light pole 416, and/or a road 420. Attributes may be defined as one particular type of data in pixels and/or data points that make up the 2D image. Therefore, in general, each observation and/or data point may contain many different attributes such that the different attributes create a representation of given dimension (number of attributes, extracted features). As such, a model may be used to look for the attributes, and other features which in turn may generate new attributes (extracts attributes from attributes) which are more complex objects then the previous. Non-limiting examples of attributes may include a building structure attribute, a road width attribute, a road angle attribute, a pedestrian and/or bike angle attribute, other vehicles width and/or direction attribute, another vehicle's angle attribute, a lighting and/or shading attribute, a weather attribute, and/or the like. It should be appreciated that because the object of interest 404 is not present in the background images 408, the entire background may be analyzed for attributes, as discussed above.

It should be understood that the background images 408 may also include the object of interest 404 or a portion of the object of interest. As such, it should be understood that any kind of software and/or algorithm known in the art for pixel matching may be used to recognize and to exclude the object of interest 404 from the background images 408. For example, pixel-wise matching may be used to determine the object of interest 404 from the 3D model and match the object of interest in the background images 408 such that the object of interest may be removed from the background images 408.

Referring again to FIGS. 3 and 4B, at block 316, the background images 408 may be prepared. For instance semantic segmentation methods may be used on the background images 408 so that the processing device 204 (FIG. 2A) and/or the server computing device 130 (FIG. 1) can interpret the background objects and/or the background attributes. In some embodiments, the background images 408 may be fabricated and not captured. Therefore, in some embodiments, the background images 408 may be converted into realistic 2D images, as discussed herein, so that the background objects and/or the background attributes can be interpreted.

Figure 4C:
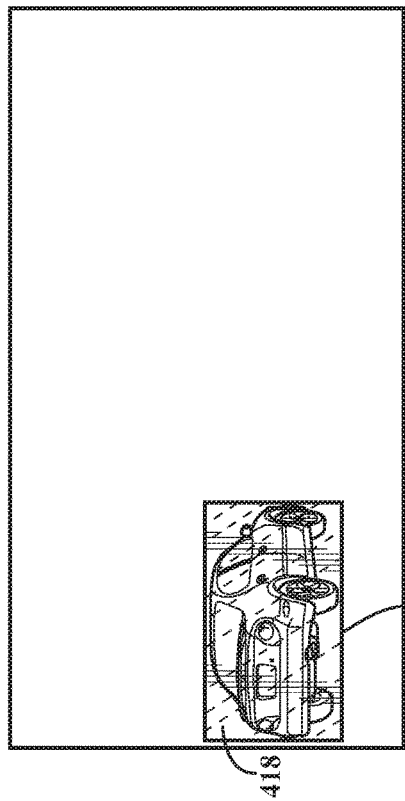
FIG. 4C schematically depicts an illustrative view of weather attributes merged with a cropped two dimensional image according to one or more embodiments shown and described herein.

Referring to FIGS. 3 and 4B-4D, at block 318, the background images 408 are categorized by the processing device 204 (FIG. 2A) based on one or more attributes of the background. The attributes depicted in FIG. 4B includes the building 410, the traffic light signal 412, the sidewalk 414, the traffic light pole 416, and the road 420. The attributes in FIG. 4D include the weather attributes 418, the building 410, the traffic light signal 412, the sidewalk 414, the traffic light pole 416, and the road 420. At block 320, a selected attribute of the one or more attributes may be added to the plurality of cropped 2D images 402. The selected attributes may be the weather attributes 418 (FIG. 4D) and the lighting and/or shading attributes (not shown). These attributes are added into the plurality of cropped 2D images 402 based on the background images 408. That is, the weather attributes 418 and lighting and/or shading attributes, as categorized at block 316, are now added into the plurality of cropped 2D images 402, as best seen in FIG. 4C. As such, if the weather attributes 418 included rain at block 314, then the attribute was categorized as such, at block 316. Then, at block 318, the appropriate weather attributes 418 would be added into the plurality of cropped 2D images 402.

It should be understood that the plurality cropped of 2D images 402 have their backgrounds removed at block 308, as such, backgrounds represent the model background. As such, the attributes removed may not be real-time attributes. Therefore, in order to provide the plurality cropped of 2D images 402 with real-time data, the captured attributes in background images 408 of block 314 are added into the plurality cropped of 2D images 402, as best seen in FIG. 4C.

With reference to FIG. 4C, the plurality of cropped 2D images 402 is shown with the weather attributes 418 added. The plurality of cropped 2D images 402 now includes the object of interest 404 and the weather attributes 418. As shown, the weather attributes 418 for the current background is rain. However, as discussed herein, it should be appreciated that any weather attribute may be incorporated into the plurality of cropped 2D images 402 based on the background images captured by the image capturing device 115 (FIG. 2A) or generated by the server computing device 130 (FIG. 1).

It should also be appreciated that attributes are used in machine learning such that the machine learning algorithms are trained to probe the data to find structure, or the attributes, even if the attributes are dynamic or the structure is not known. As such, the attributes are added into the plurality of cropped 2D images 402 so that the machine learning may identify the attributes and learn from the data of the attributes.

Now referring to FIGS. 3 and 4D, at block 322, the background images 408 are synthesized. That is, the pixels of the background images 408 are combined with the pixels of the plurality of cropped 2D images 402 such that a replica of the 3D model may be generated in two-dimensions with real time background information. However, because the background images 408 and the plurality of cropped 2D images 402 may be from two different domains, during the synthesizing process, the domains may be merged into a single domain. That is, the plurality of cropped 2D images 402 and the background images 408 that are still semantically segmented or the like may be converted into photo realistic images such that now both images are merged together and in the same domain. It should be appreciated that converting the semantically segmented images to the realistic images and/or synthesizing images is by using methods that those skilled in the art would appreciate, and as described above.

With reference to FIG. 4D, the merger of the background images 408 and the plurality of cropped 2D images 402 into the 2D synthesized images 424 is shown. The object of interest 404 is positioned onto the road 420 and the background still includes the same attributes, the building 410, the traffic light signal 412, the traffic light pole 416, the sidewalk 414, and the road 420. Moreover, now the weather attributes 418 and the lighting/shading attributes (not shown) indicate a complete plurality of 2D images for this scene.

With reference back to FIGS. 3 and 4D, at block 324, the exact position of the synthesized images 424 is annotated. Such annotation may include the use of bounding box annotation 422 and/or by pixel-wise annotation (not shown). Bounding box annotation 422 generally refers to a drawn box around pixels to be annotated when the pixels are grouped together. For example, as shown in FIG. 4D, the bounding box annotation 422 may surround the pixels of the vehicle. This use of the bounding box annotation 422 may provide information such as the type of object, the size of the object, and/or the like. For instance, the data of the pixels within the bounding box annotation 422, which surrounds the object of interest 404, may be used to determine whether the object of interest is the vehicle, based on the shape of the vehicle, the shading of the vehicle, the size of the vehicle, and/or the like. Further, computer programs and algorithms may interpret the data within the bounding box annotation 422 to determine the type of vehicle, the size of the vehicle, the location of the vehicle within the scene, the relationship of the vehicle to other bounding boxes, and/or the like. On the other hand, pixel-wise annotation (not shown) uses each pixel in the scene as the data points such that each pixel may be assigned a value so that the processing device 204 (FIG. 2A) may use programming and/or algorithms to interpret the data, such as pixel shading, in an effort to understand the scene.

It should be understood that the annotation is not limited to 2D annotation (x, y), but may also use 3D annotation (x, y, z), such that the annotation and the synthesized images 424 is compatible with 3D machine learning algorithms. After the annotation is completed, the synthesized images 424 are stored at block 326.

It should be appreciated the while method 300, as described herein, describes the vehicle component 200 as generating the 2D images, the server computing device 130 may also generate these images. The vehicle 110 may capture the background images 408 while the background images 408 and the other data is transmitted by the vehicle 110 to the server computing device 130 such that the server computing device 130 performs the method 300. Moreover, the vehicle 110 may not gather the background images and the server computing device 130 may use its own or other background images to generate the 2D images as described in the method 300.

It should also be appreciated that the stored images contain enough data sets to provide the machine learning algorithms with the same realistic data and information as much larger files that use more storage space and more powerful processors, such as 3D CAD drawings. Further, as a result of the stored 2D images, the 3D CAD files may be removed from the vehicle design data storage.

In other embodiments, the image data collection may be from inside the vehicle. In these embodiments, a human pose object detection, and pixel wise segmentation algorithms may be used. In one embodiment, instead of synthesizing the background images at block 314, the driver and/or passenger may be synthesized. As such the pose of a human model may be annotated. Moreover, in other embodiments as discussed above, the interior of the vehicle may be synthesized. For example, the meter of the vehicle, the navigation, the infotainment system, the gear shifter, the steering wheel, and the like may be synthesized. This may provide a way to recognize devices, which are in the vehicle and how the driver reacts, what a driver does, how a driver moves, and/or the like. Therefore, data may be gathered on driver information and reactions such that these reactions and interactions with the interior of the vehicle may be mimic in autonomous, semi-autonomous, and/or driverless vehicles.

It should now be understood that the methods, systems, and vehicle components described herein may function to decrease an amount of data storage used to contain training data in machine learning, and/or to reduce processing power necessary for training data used in machine learning. The method includes using semantic segmentation to analyze a scene within the 3D model, determining an object of interest from the analysis, and cropping the object of interest into a plurality of 2D images. The plurality of 2D images are cropped such that only objects of interest remain and the background objects are removed. The plurality of 2D images are also cropped with respect to particular attributes, such as a road width, a road angle, an angle of a surrounding vehicle, and/or the like. In addition, an image capturing-device captures the real-time background images. The background images are prepared and the objects in the background are categorized using associated attributes. Particular attributes are added into the plurality of 2D images and the other attributes are synthesized with the plurality of cropped 2D images such that a replica 2D image with the real time background is generated. Once synthesized, the newly created images may be annotated and stored. As a result, data storage is minimized because the plurality of 2D images, when taken together, generally require less data storage than the 3D models, but still contain all the information of the 3D models.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of reducing a size of machine learning data stored on a vehicle storage device, the method comprising:
receiving, by a processor, data comprising a three-dimensional model;
analyzing, by the processor, a scene within the three-dimensional model to identify an object of interest and one or more additional objects;
capturing, by the processor, the object of interest and the one or more additional objects as a plurality of two-dimensional images;
removing, by the processor, the one or more additional objects from the plurality of two-dimensional images to obtain a plurality of cropped two-dimensional images:
storing, by the processor, the plurality of cropped two-dimensional images in the vehicle storage device;
receiving, by the processor, a background image from an image sensor, the background image comprising a background surrounding the object of interest;
categorizing, by the processor, the background image based on one or more attributes of the background;
adding, by the processor, a selected attribute of the one or more attributes to the plurality of cropped two-dimensional images;
synthesizing, by the processor, one or more synthesized images from the plurality of cropped two-dimensional images and the selected attribute; and
annotating, by the processor, the one or more synthesized images with an exact position of the selected attribute.

2. The method of claim 1, wherein the selected attribute of the one or more attributes is at least one of a weather attribute, a lighting attribute, and a shading attribute.

3. The method of claim 1, wherein annotating comprises constructing a bounding box around the selected attribute.

4. The method of claim 3, wherein annotating comprises using a pixel-wise annotation of the selected attribute.

5. The method of claim 1, wherein removing the one or more additional objects comprises selecting the one or more additional objects from a plurality of background attributes.

6. The method of claim 5, wherein the plurality of background attributes are selected from a road width, a road angle, or an angle of a surrounding vehicle.

7. The method of claim 1, wherein the plurality of cropped two-dimensional images are cropped using at least one of a road width attribute, a road angle attribute or an angle of a surrounding vehicle attribute to establish a relationship between the object of interest and the one or more additional objects.

8. The method of claim 1, wherein the plurality of background attributes are selected from a building, a traffic light signal, a sidewalk, a traffic light pole, or a road.

9. A system for decreasing an amount of data storage used to contain training data in machine learning, the system comprising:
a processor;
an image sensor communicatively coupled to the processor, wherein the image sensor captures a plurality of background images; and
a non-transitory, processor-readable storage medium, the non-transitory, processor-readable storage medium comprising one or more programming instructions thereon that, when executed, cause the processor to:
receive, by the processor, data comprising a three-dimensional model;

analyze, by the processor, a scene within the three-dimensional model to identify an object on interest and one or more additional objects;

capture, by the processor, the object of interest and the one or more additional objects as a plurality of two-dimensional images;

remove, by the processor, the one or more additional objects from the plurality of two-dimensional images to obtain a plurality of cropped two-dimensional images; and store, by the processor, the plurality of cropped two-dimensional images in a vehicle storage device;

receive, by the processor, a background image from the image sensor, the background image comprising a background surrounding the object of interest categorize, by the processor, the background image based on one or more attributes of the background;

add, by the processor, a selected attribute of the one or more attributes to the plurality of cropped two-dimensional images;

synthesize, by the processor, one or more synthesized images from the plurality of cropped two-dimensional images and the selected attribute; and annotate, by the processor, the one or more synthesized images with an exact position of the selected attribute.

10. The system of claim 9, wherein the processor is caused to annotate the one or more synthesized images by at least constructing a bounding box around the selected attribute.

11. The system of claim 9, wherein the processor is caused to annotate the one or more synthesized images by at least using a pixel-wise annotation of the selected attribute.

12. The system of claim 9, wherein the processor is caused to remove the one or more additional objects by at least selecting the additional objects from a plurality of background attributes.

13. The system of claim 12, wherein the plurality of background attributes are selected from a road width, a road angle, and an angle of a surrounding vehicle.

14. The system of claim 9, wherein the plurality of cropped two-dimensional images are cropped using at least one of a road width attribute, a road angle attribute or an angle of a surrounding vehicle attribute to establish a relationship between the object of interest and the one or more additional objects.

15. The system of claim 9, wherein the plurality of background attributes are selected from a building, a traffic light signal, a sidewalk, a traffic light pole, or a road.

16. The system of claim 9, wherein the selected attribute of the one or more attributes is at least one of a weather attribute, a lighting attribute, or a shading attribute.

17. A system for decreasing an amount of data storage used to contain training data in machine learning, the system comprising:

a first processor;

an image sensor communicatively coupled to the first processor;

a second processor that is external to the first processor and is communicatively coupled to the first processor; and a non-transitory, processor-readable storage medium, the non-transitory, processor-readable storage medium comprising one or more programming instructions thereon that, when executed, cause the first processor to:

receive data comprising a three-dimensional model;

analyze a scene within the three-dimensional model to identify an object of interest one or more additional objects;

capture the object of interest and the one or more additional objects as a plurality of two-dimensional images;

transmit the plurality of two-dimensional images to the second processor;

receive a signal from the second processor indicating that the plurality of two-dimensional images are realistic images;

remove the one or more additional objects from the plurality of two-dimensional images to obtain a plurality of cropped two-dimensional images;

store the plurality of cropped two-dimensional images in a vehicle storage device, receive the background image from the image sensor, the background image comprising a background surrounding the object of interest categorize the background image based on one or more attributes of the background;

add a selected attribute of the one or more attributes to the plurality of cropped two-dimensional images;

synthesize one or more synthesized images from the plurality of cropped two-dimensional images and the selected attribute; and annotate the one or more synthesized images with an exact position of the selected attribute.

18. The system of claim 17, wherein the processor is caused to annotate the one or more synthesized images by at least constructing a bounding box around the selected attribute or using a pixel-wise annotation of the selected attribute.

19. The system of claim 17, wherein the wherein the plurality of cropped two-dimensional images are cropped using at least one of a road width attribute, a road angle attribute or an angle of a surrounding vehicle attribute to establish a relationship between the object of interest and the one or more additional objects.

20. The system of claim 17, wherein the plurality of background attributes are selected from a building, a traffic light signal, a sidewalk, a traffic light pole, or a road.

* * * * *